(12) United States Patent
Aguilar Ruelas et al.

(10) Patent No.: US 11,066,019 B2
(45) Date of Patent: Jul. 20, 2021

(54) SLIDING TRAY

(71) Applicant: Ford Global Technologies, LLC, Dearborn, MI (US)

(72) Inventors: Eduardo Arturo Aguilar Ruelas, Mexico City (MX); Jose Luis Gallardo, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 16/135,035

(22) Filed: Sep. 19, 2018

(65) Prior Publication Data

US 2020/0086799 A1 Mar. 19, 2020

(51) Int. Cl.
*B60R 5/00* (2006.01)
*B60R 5/04* (2006.01)
*B60R 7/02* (2006.01)
*B60R 13/01* (2006.01)

(52) U.S. Cl.
CPC ............... *B60R 5/048* (2013.01); *B60R 7/02* (2013.01); *B60R 13/013* (2013.01)

(58) Field of Classification Search
CPC .. B60R 5/20; B60R 5/04; B60R 5/048; B60R 7/02; B60R 11/0029; B60R 13/013; B60R 2013/018; B60R 13/011; B62D 43/10
USPC ................ 296/37.16, 37.14, 37.3, 37.5, 37.6
See application file for complete search history.

(56) References Cited

U.S. PATENT DOCUMENTS

| | | | |
|---|---|---|---|
| 3,393,936 A | 7/1968 | Hall | |
| 3,896,742 A | 7/1975 | Ferraro | |
| 4,226,348 A | 10/1980 | Dolor et al. | |
| 5,257,846 A * | 11/1993 | Kanai | B60R 5/04 296/37.14 |
| 5,322,335 A * | 6/1994 | Niemi | B60N 2/6009 296/39.1 |
| 5,484,091 A | 1/1996 | Malinowski et al. | |
| 5,570,921 A | 11/1996 | Brooker | |
| 6,439,633 B2 * | 8/2002 | Nemoto | B60P 7/0876 296/37.14 |
| 6,682,118 B2 | 1/2004 | Ryan | |
| 7,730,586 B2 * | 6/2010 | McDonald | E05D 7/009 16/326 |

* cited by examiner

*Primary Examiner* — Stephen T Gordon
(74) *Attorney, Agent, or Firm* — David Coppiellie; Price Heneveld LLP (57) ABSTRACT

A vehicular cargo assembly includes a first panel slidably mounted on a floor of a vehicle cabin and selectively and alternatively positionable in a first position or a second position. A storage space is disposed below the floor. The first panel is configured to cover the storage space in the first position.

16 Claims, 12 Drawing Sheets

SLIDING TRAY

FIELD OF THE DISCLOSURE

The present disclosure generally relates to a cargo assembly for a vehicle, and more particularly, to a cargo assembly including adjustable panels.

BACKGROUND OF THE DISCLOSURE

Some vehicles include extended cargo compartments in order to increase cargo carrying capacity of the vehicle. It would be beneficial to adapt an extended cargo compartment with an assembly configured to reduce loading effort. The present disclosure is intended to satisfy this need.

SUMMARY OF THE DISCLOSURE

According to a first aspect of the present disclosure, a vehicular cargo assembly includes a first panel slidably mounted on a floor of a vehicle cabin and selectively and alternatively positionable in a first position or a second position. A storage space is disposed below the floor. The first panel is configured to cover the storage space in the first position.

Embodiments of the first aspect of the disclosure can include any one or a combination of the following features:
- a second panel disposed over the storage space and covered by the first panel when the first panel is in the first position;
- when the first panel is in the first position the first panel is selectively and alternatively positionable in a flat position, a bent position, and a upright folded position;
- the second panel is selectively and alternatively positionable in a corresponding and respective flat orientation, a bent orientation, and a upright folded orientation;
- the storage space comprises a first storage space and a second storage space;
- when the first panel is in the bent position and the second panel is in the bent orientation, then the first storage space is accessible;
- when the first panel is in the upright folded position and the second panel is in the upright folded orientation, then the first and second storage spaces are accessible;
- when the first panel is in the second position, the second panel is selectively and alternatively positionable in a flat orientation, a bent orientation, or a upright folded orientation;
- when the first panel is in the second position a first portion of the second panel is rotatable from a substantially horizontal orientation to a substantially vertical orientation, so that the first portion of the second panel is orthogonal to a second portion of the second panel to allow access to a first storage space;
- when the first panel is in the second position the first portion of the second panel is rotatable from the substantially vertical orientation to an inverted orientation to allow access to the first storage space and a second storage space;
- the first panel includes fasteners to restrain the first panel in one or more of the first position and the second position;
- the first panel comprises a thinned zone forming a bendable intersection between a first section and a second section of the first panel; and
- the first panel includes a peripheral rim.

According to a second aspect of the present disclosure, a vehicular cargo assembly includes a vehicle cabin having a floor. A portion of a vehicle forms a storage space below the floor and includes a first panel and a second panel. The first panel is slidably coupled to the second panel. The first panel moves from a first position to a second position to transfer cargo from an outer area to an inner area of the vehicle cabin. The first panel is stacked above the second panel in the first position. The first panel is adjacent the second panel in the second position.

Embodiments of the second aspect of the disclosure can include any one or a combination of the following features:
- when the first panel is in the first position, then the first panel is positionable in a upright folded position and the second panel is positionable in a upright folded orientation to access the storage space;
- the first panel comprises a first section and a second section, wherein the first panel is positionable in the upright folded position when the first section of the first panel is rotated from a substantially horizontal position to a substantially vertical position and from the substantially vertical position to an inverted position; and
- the second panel comprises a first portion and a second portion, wherein the second panel is positionable in a upright folded orientation when a first portion of the second panel is rotated form a substantially horizontal orientation to a substantially vertical orientation and from the substantially vertical orientation to an inverted orientation.

According to a third aspect of the present disclosure, a storage system for a vehicle includes a cargo area having a recessed storage space, a first panel, and a second panel. In a first position, the first and second panels are disposed over the recessed storage space. In a second position, the first panel is disposed adjacent the second panel. The first panel slides from the first to the second position.

Embodiments of the third aspect of the disclosure can include any one or a combination of the following features:
- a seating assembly adjacent to the first and second panels in the first position, wherein the seating assembly is selectively positionable in an upright position and a downward position, wherein the first panel is disposed over the seating assembly in a downward position when the first panel is in the second position; and
- the second panel and the seating assembly in a downward position form a substantially planar surface and wherein the first panel slides between first and second positions on the substantially planar surface.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
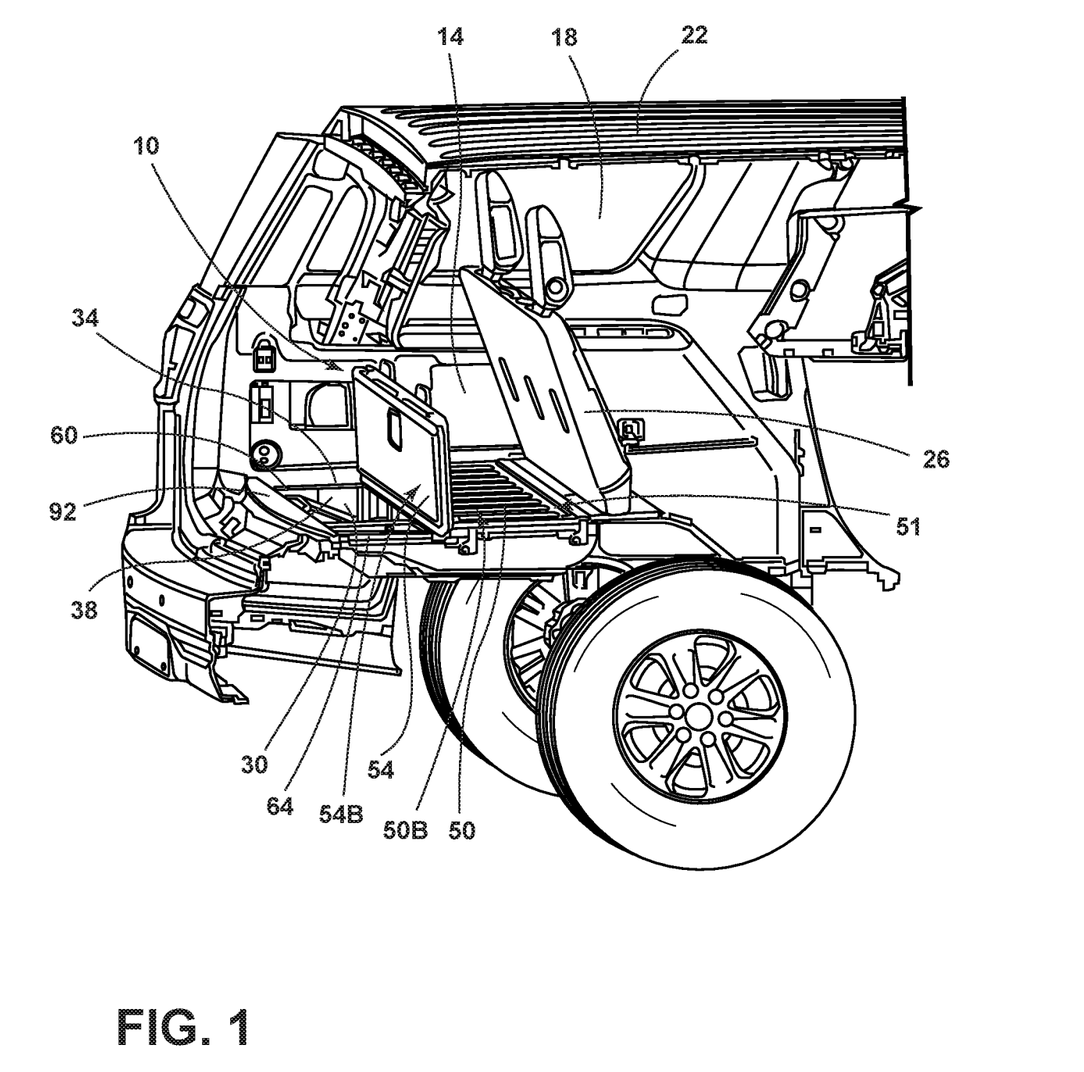
FIG. 1 is a perspective view of a vehicular cargo assembly within a vehicle cargo compartment including a first panel and a second panel in bent positions.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The following disclosure describes a cargo assembly for a vehicle, and in particular, a cargo assembly including at least a first panel and a second panel adapted to facilitate the loading and unloading of cargo to and from a vehicle cargo compartment. The first panel may be a sliding tray. The sliding tray may be disposed at an outer area of the vehicle cargo compartment in a first position, and the sliding tray may be disposed at an inner area of a vehicle cargo compartment in a second position. In the first or stacked position, the first panel may be disposed on top of the second panel. In the second or adjacent position, the first panel may be disposed adjacent the second panel. The second panel may be a cover for a storage area beneath the cabin floor. The cover may remain stationary at the outer area of the vehicle cargo compartment as the tray moves between the first and second positions to transfer cargo between the outer and the inner areas of the cargo compartment. In this way the cargo assembly enables an individual to load cargo further into the cargo compartment without having to extend their body into the vehicle cabin. As such, the cargo assembly reduces the potential for strain and injury while loading and unloading cargo within the vehicle.

In addition to providing a first panel or a sliding tray for convenient transfer of cargo in the vehicle cargo compartment, the first panel or tray and the second panel or cover may be configured to allow access to a storage space disposed under a cabin floor. The first panel (tray) may be generally planar and may be foldable between a flat position, a bent position, and an upright folded position. Similarly, the second panel (cover) may be generally planar and may be foldable between a flat orientation, a bent orientation, and an upright folded orientation. The storage space disposed below the cabin floor may include a first storage space and a second storage space. The first panel and the second panel may be configured to selectively access various portions of the storage space. For example, the first and second panels may be configured to access the first storage space or the first and second storage spaces. As such, an individual may conveniently utilize the slidable tray (first panel) while accessing the storage space disposed below the cabin floor.

Referring to FIGS. 1-9, reference numeral 10 generally designates a vehicular cargo assembly as shown within a cargo compartment 14 of a vehicle cabin 18. The cargo compartment 14 may be generally adapted for the storing of cargo items within the vehicle cabin 18. The vehicle 22 may be any vehicle 22 having an open cabin 18 with extendable cargo space for storing additional cargo items. However, the vehicle 22 may additionally be any vehicle 22 having a traditional trunk space for storing cargo items. The vehicle 22 may include a rear seating assembly 26 positioned forward relative to the cargo compartment 14. The rear seating assembly 26 may be adjustable between an upright position (FIGS. 1, 2, 5, and 6) and a downward position (FIGS. 3, 4, 7, and 8). The vehicle 22 may include a cargo door (not shown) configured to enable access to the cargo compartment 14 while in an open position. Storage space 30 may be disposed below a cabin floor 34. The storage space 30 includes a first storage space 38 and a second storage space 42.

Figure 2:
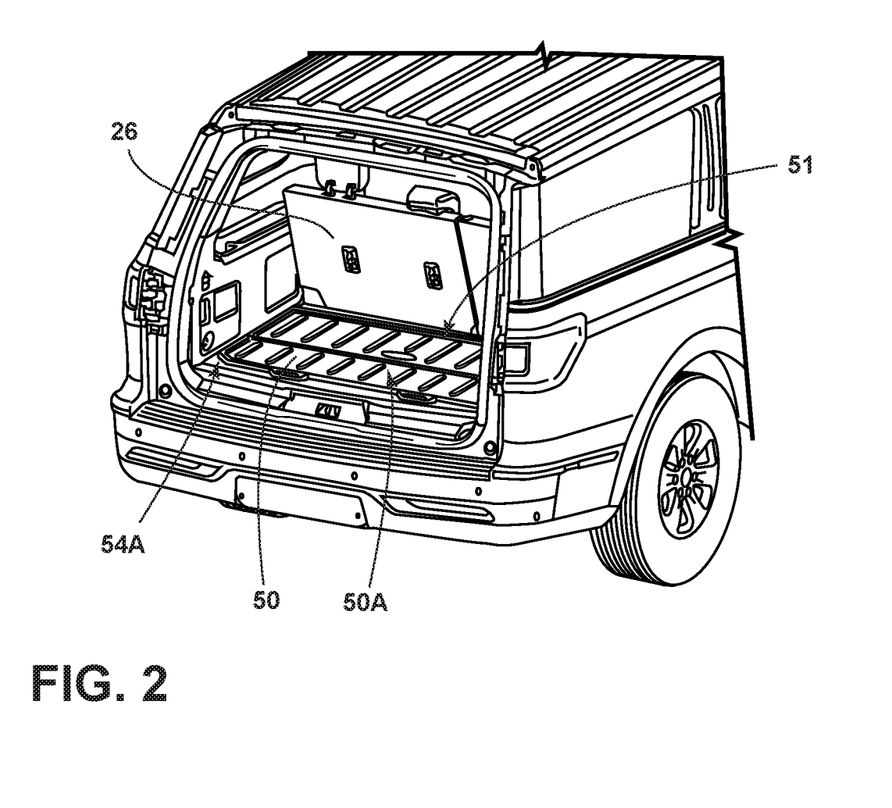
FIG. 2 is a perspective view of the vehicular cargo assembly including the first panel disposed in a first position.
Figure 3:
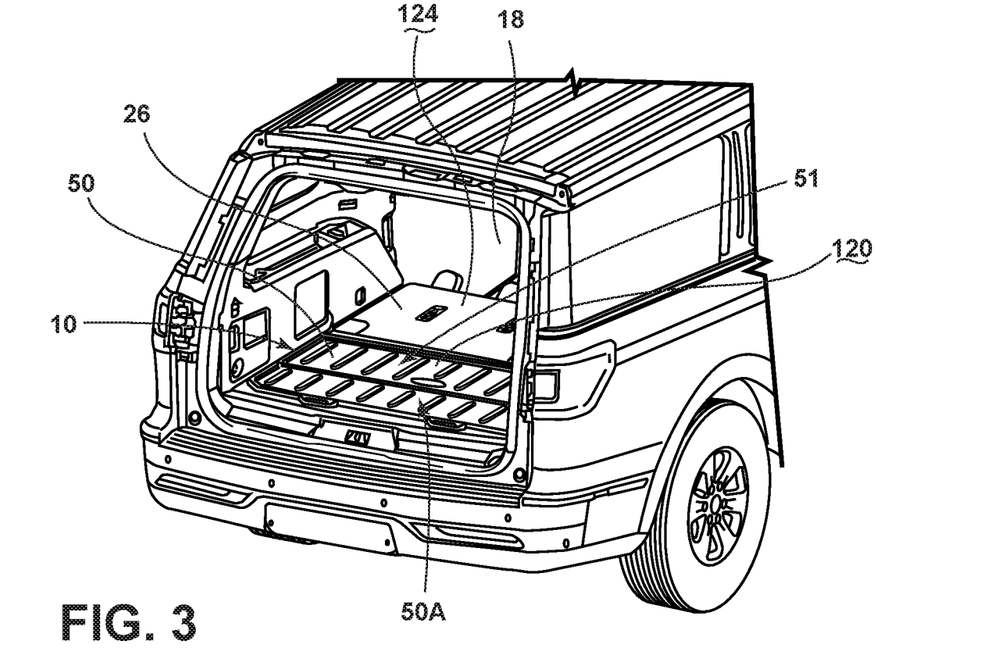
FIG. 3 is a perspective of the vehicular cargo assembly including the first panel disposed in the first position with a rear seating assembly disposed in a downward position.
Figure 4:
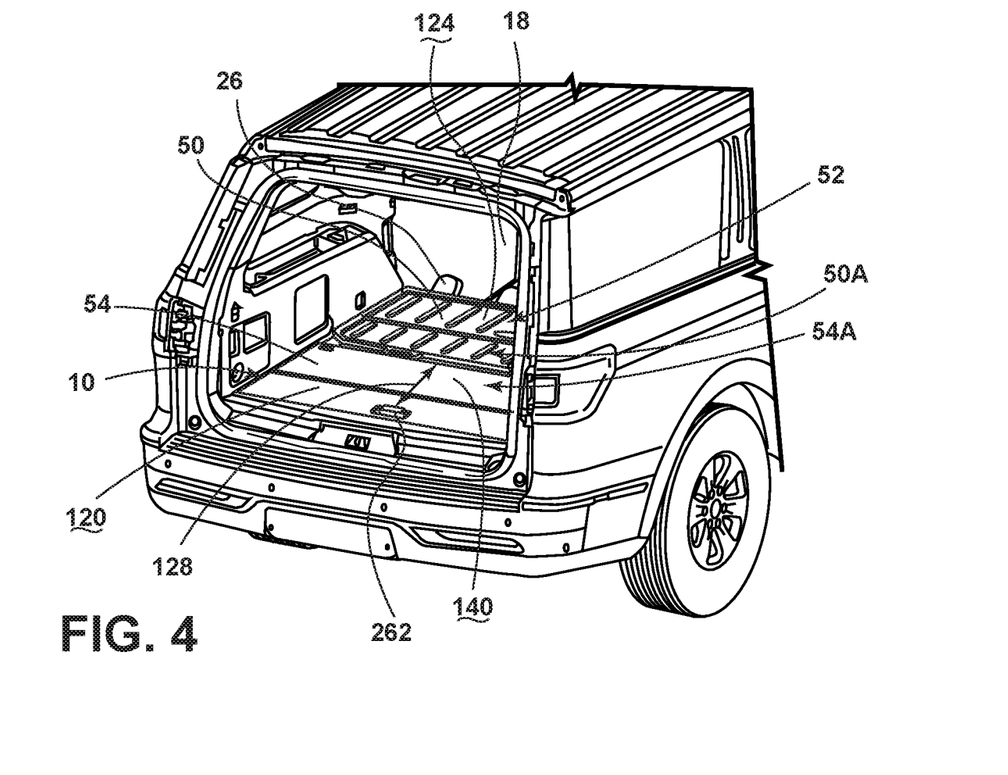
FIG. 4 is a perspective view of the vehicular cargo assembly including the first panel disposed in a second position with the rear seating assembly disposed in the downward position.
Figure 5:
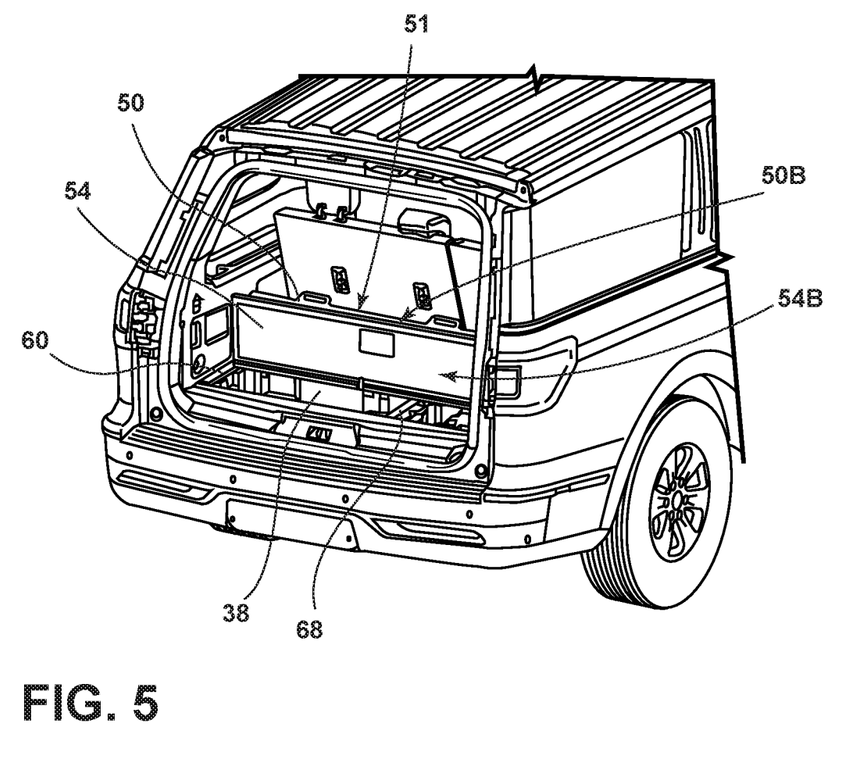
FIG. 5 is a perspective view of the vehicular cargo assembly including the first panel in a bent position and the second panel in a bent position.
Figure 6:
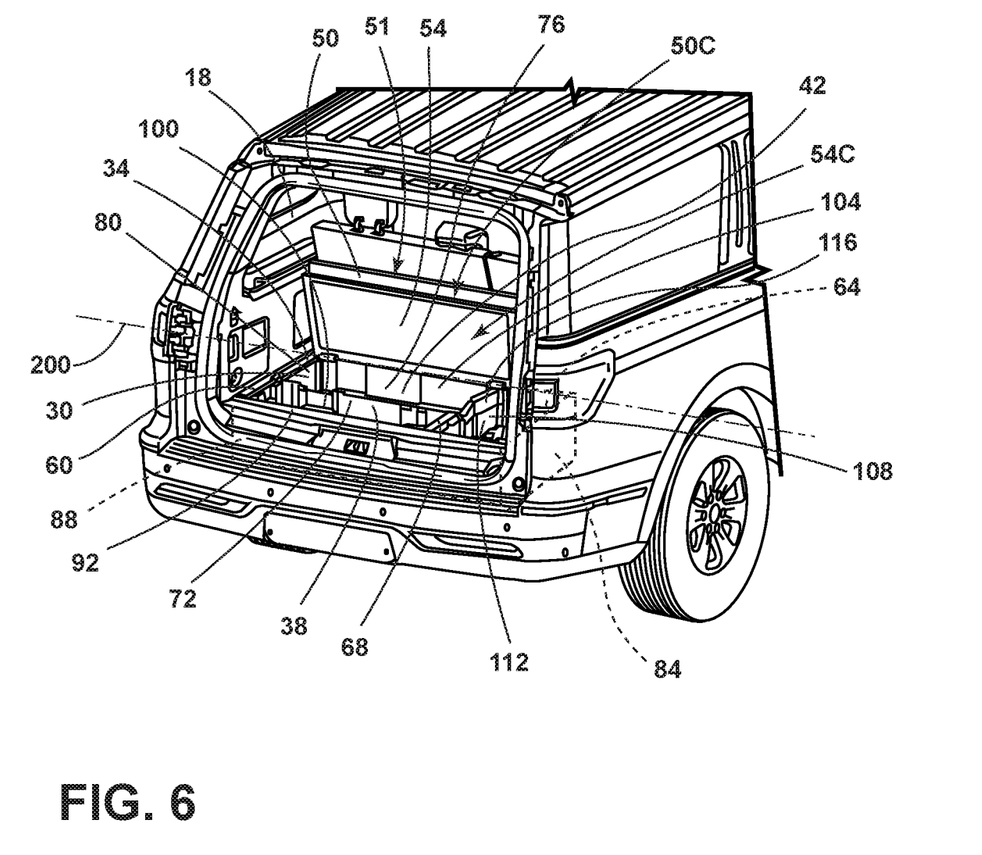
FIG. 6 is a perspective view of the vehicular cargo assembly including the first panel in a upright folded position and the second panel in a upright folded position.
Figure 7:
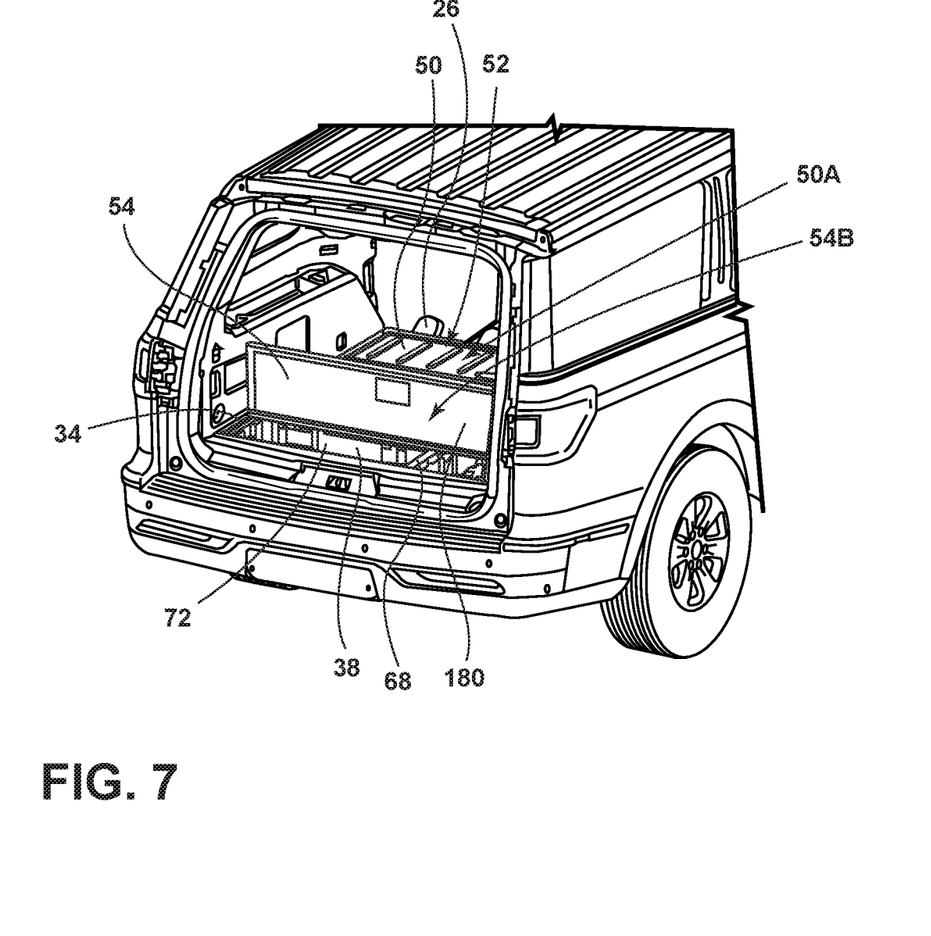
FIG. 7 is a perspective view of the vehicular cargo assembly including the first panel in a second position and the second panel in the bent position with the rear seating assembly disposed in the downward position.
Figure 8:
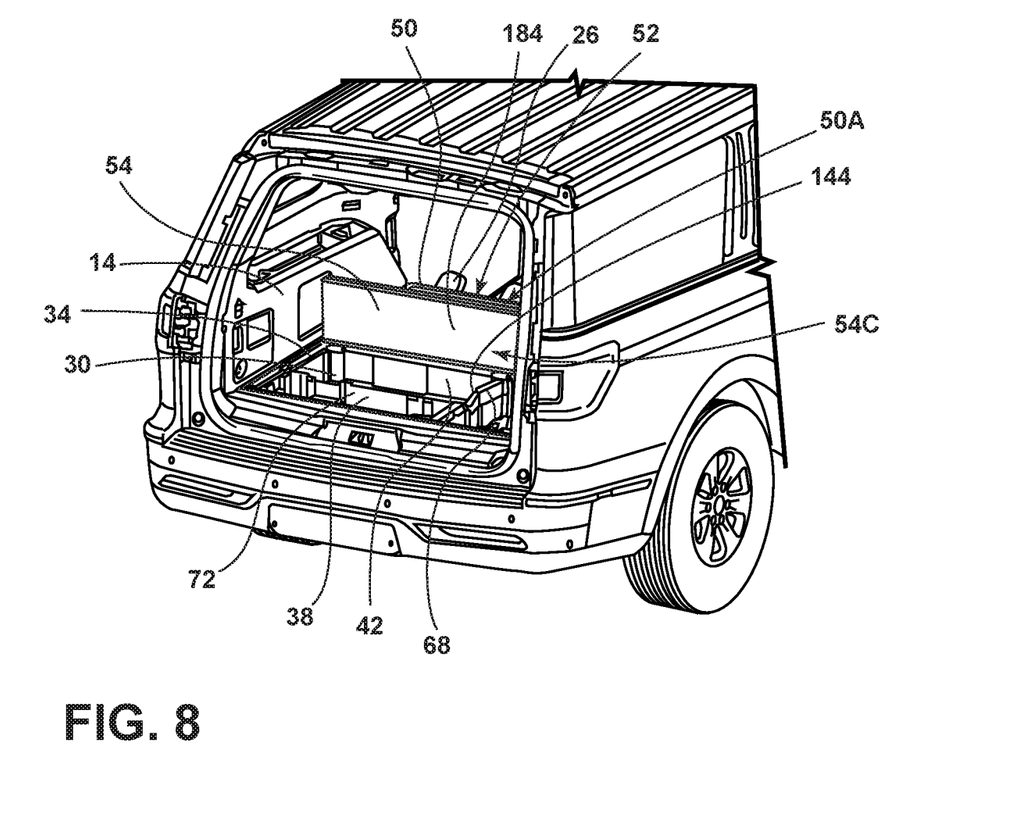
FIG. 8 is a perspective view of the vehicular cargo assembly including the first panel in the second position and the second panel in a upright folded position with the rear seating assembly disposed in the downward position.

With continued reference to FIGS. 1-9, the cargo assembly 10 may include a first panel 50 and a second panel 54 disposed within the cargo compartment 14 of the vehicle cabin 18. Each of the first and second panels 50, 54 may be generally planar in configuration, and may be composed of a damage or scratch resistant material. For example, the first and second panels 50, 54 may be composed of acrylonitrile butadiene styrene (ABS), polycarbonate, or other damage resistant thermoplastic materials. In another example, the first panel 50 may be made of a plastic (e.g., acrylonitrile (ABS), polycarbonate, or other damage resistant thermoplastic material), and the second panel 54 may be made of carbon fiber or a similar material. As previously stated, the first panel 50 may be a slidable tray and the second panel 54 may be a cover. The second panel 54 or cover may be disposed over the storage space 30. The second panel 54 or cover may include a typical vehicle cabin 18 floor material such as a carpet disposed over a structural component. The first panel 50 may be adjusted relative to the second panel 54 in a first position 51 (stacked position) or a second position 52 (adjacent position). The first panel 50 in the first position 51 is shown in FIGS. 1-3 and 5-6. The first panel 50 in the second position 52 is shown in FIGS. 4, 7, and 8. When the first panel 50 is in the first position 51 or the second position 52, the first panel 50 and the second panel 54 may be configured to access the storage space 30 beneath the cabin floor 34. The first panel 50 may be adjusted between a flat position 50A (FIGS. 2-4 and 7-8), a bent position 50B (FIGS. 1 and 5), and an upright folded position 50C (FIG. 6). The second panel 54 may be adjusted between a flat orientation 54A (FIGS. 2-4), a bent orientation 54B (FIGS. 1, 5, and 7), or an upright folded orientation 54C (FIGS. 6 and 8). When the first panel 50 is in the second position 52, it may be disposed over the rear seating assembly 26 disposed in the downward position (FIGS. 4, 7, 8).

Referring now to FIG. 6, a cabin floor 34 may support the first and second panels 50, 54 and may suspend the first and second panels 50, 54 above the storage space 30. The storage space 30 may be disposed beneath the cabin floor 34. In various aspects, first and second supporting ledges 60, 64 disposed on either side of a vehicle cabin 18 or trunk (not shown) may define the cabin floor 34. Additionally or alternatively, various supporting members disposed between the first and second supporting ledges 60, 64 may define the cabin floor 34. In the depicted aspect, the longitudinal support member 68 may be disposed between the first and second supporting ledges 60, 64 and may be generally parallel to the first and second supporting ledges 60, 64. In the depicted aspect, first and second lateral support members 72, 76 may be disposed between the first and second supporting ledges 60, 64 and may be generally transverse to the first and second supporting ledges 60, 64. As such, the cabin floor 34 may be defined by structures that support the first and second panels 50, 54.

With continued reference to FIG. 6, the storage space 30 disposed beneath the cabin floor 34 may be subdivided and selectively accessible. The storage space 30 may be generally defined by the first and second body portions 80, 84 extending below the respective first and second supporting ledges 60, 64, a body portion 88 extending below a loading ledge 92, the second lateral support member 76, and a bottom portion (not shown). In the aspect shown, the storage space 30 may be divided into a first compartment 100, a second compartment 104, and a third compartment 108. The first compartment 100 may be defined by the first body portion 80 below the first supporting ledge 60, the longitudinal support member 68, the body portion 88 below the loading ledge 92, the first lateral support member 72, and the bottom portion (not shown). The second compartment 104 may be defined by the first body portion 80 below the first supporting ledge 60, the longitudinal support member 68, the first lateral support member 72, the second lateral support member 76, and the bottom portion (not shown).

With continued reference to FIG. 6, the third compartment 108 may be defined by the longitudinal support member 68, the second body portion 84 below the second supporting ledge 64, the body portion 88 below the loading ledge 92, the second lateral support member 76, and the bottom portion (not shown). The third compartment 108 may include an outer portion 112 and an inner portion 116. The first storage space 38 may include the first compartment 100 and an outer portion 112 of the third compartment 108. The second storage space 42 may include the second compartment 104 and an inner portion 116 of the third compartment 108. As such, in various aspects of the disclosure, compartments in the storage space 30 may be arranged in various configurations. Fewer than three or more than three compartments may be disposed in the storage space. The compartments may have different features. For example, one storage compartment may be cooled by the vehicle air conditioning system. Another storage compartment may contain a light source for illuminating the compartment at night. Thus, the storage space 30 may be customized.

Referring now to FIGS. 2-4, first, second, and third steps that may be used for transferring the first panel 50 from the first position 51 to the second position 52 are shown. Referring to FIG. 2, in the first step, the first panel 50 is shown in the first position 51 and the rear seating assembly 26 is shown in the upright position. Referring to FIG. 3, in the second step the first panel 50 is shown in the first position 51 and the rear seating assembly 26 is shown in the downward position. Referring to FIG. 4, in the third step the rear seating assembly 26 is shown in the downward position and the first panel 50 is shown in the second position 52. When the rear seating assembly 26 is disposed in the downward position, the seating assembly 26 and the second panel 54 may form a substantially planar surface 140 over which the first panel 50 may slide between the first and second positions 51, 52 (FIG. 4). Arrow 128 in FIG. 4 shows the directions in which the first panel 50 may slide.

Regardless of whether the first and second panels 50, 54 of the cargo assembly 10 are disposed in the stacked configuration (first panel 50 in first position 51) or the adjacent configuration (first panel 50 in second position 52), access to the storage space 30 may be available. With reference to FIGS. 5 and 6, when the first panel 50 is in the first position 51, the first storage space 38 (FIG. 5) or the first and second storage spaces 38, 42 (FIG. 6) may be accessible. As shown in FIG. 5, when the first panel 50 is in the first position 51, the first storage space 38 may be accessed by configuring the first panel 50 in the bent position 50B and by configuring the second panel 54 in the bent orientation 54B. As shown in FIG. 6, when the first panel 50 is in the first position 51, the first and second storage spaces 38, 42 may be accessed by configuring the first panel 50 in an upright folded position 50C and configuring the second panel 54 in an upright folded orientation 54C.

With reference to FIGS. 7 and 8, when the first panel 50 is in the second position 52, the first storage space 38 (FIG. 7) or the first and second storage spaces 38, 42 (FIG. 8) may be accessible. As shown in FIG. 7, when the first panel 50 is in a second position 52, then the first storage space 38 may be accessed by configuring the second panel 54 in the bent orientation 54B. As shown in FIG. 8, when the first panel 50 is in the second position 52, then the first and second storage spaces 38, 42 may be accessed by configuring the second panel 54 in an upright folded orientation 54C. As such, the second panel 54 may provide selective access to the first and second storage spaces 38, 42.

With further reference to FIGS. 7 and 8, it may be desirable that the cabin floor 34 provide clearance for the second panel 54 in the bent orientation 54B (FIG. 7). Therefore, the longitudinal support member 68 may include a clearance notch 144 (FIG. 8) for positioning the second panel 54 in a bent orientation 54B (FIG. 7).

Figure 9:
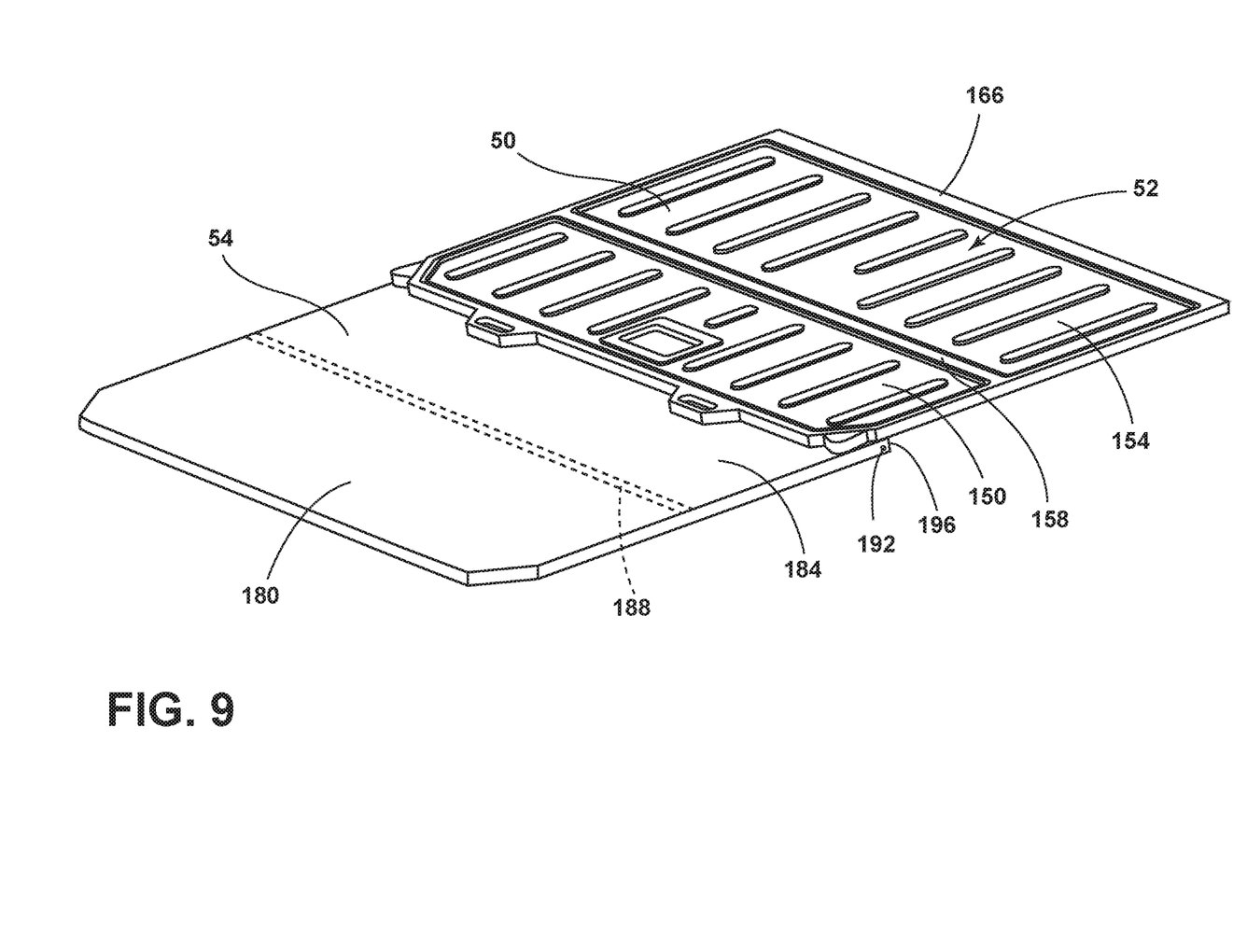
FIG. 9 is a perspective view of the first and second panels with the first panel in the second position.

The first panel 50 and the second panel 54 may include various features that may facilitate convenient configuration of the first panel 50 and the second panel 54. In FIG. 9, the first panel 50 is shown in the second position 52 relative to the second panel 54 (i.e., the first panel 50 is shown adjacent to the second panel 54). The first panel 50 may include a first section 150 and a second section 154 disposed on either side of a bendable intersection 158. The second panel 54 may include a first portion 180 and a second portion 184. The first portion 180 and the second portion 184 may be disposed on either side of a bendable intersection 188 of the second panel 54. The second panel 54 may include a pivoting connection 192 at an outer edge 196 of the second portion 184. The pivoting connection 192 may allow the second panel 54 to rotate around an axis of rotation 200 (FIG. 6) generally disposed above the second lateral support member 76.

Figure 9A:
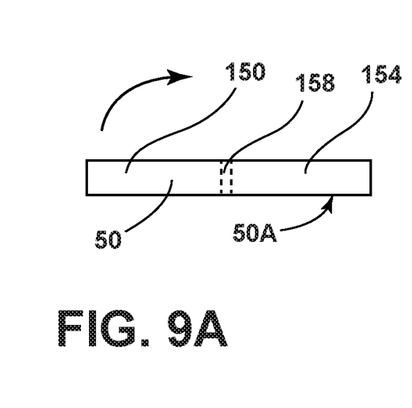
FIG. 9A is a schematic cross-sectional view of the first panel in a flat position.
Figure 9B:
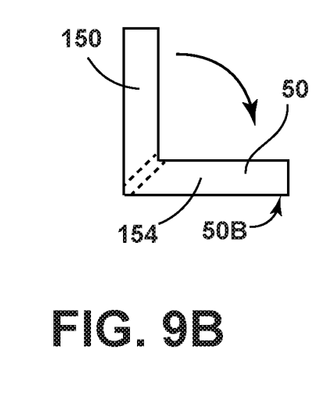
FIG. 9B is a schematic cross-sectional view of the first panel in a bent position.
Figure 9C:
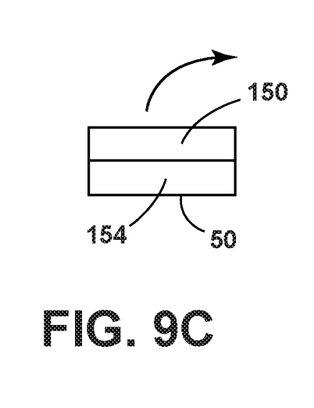
FIG. 9C is a schematic cross-sectional view of the first panel in a folded position.
Figure 9D:
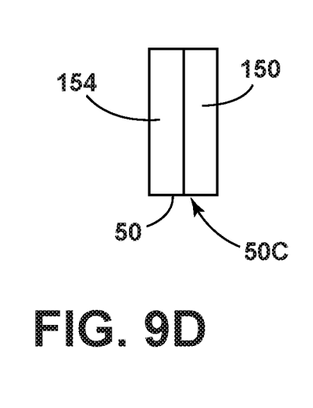
FIG. 9D is a schematic cross-sectional view of the first panel in the upright folded position.

Referring now to FIGS. 9A-9H, the first panel 50 and the second panel 54 are shown in a variety of configurations. For example, the first panel 50 is shown in the flat 50A, bent 50B, and upright folded 50C positions, and the second panel 54 is shown in the in the flat 54A, bent 54B, and upright folded 54C orientations. In FIG. 9A, the first section 150 of the first panel 50 may be rotated from a horizontal position to a vertical position in the direction shown by the arrow in FIG. 9A. In FIG. 9B, the first panel 50 is in the bent position 50B. The first section 150 is shown in a vertical position that may be orthogonal to the horizontal position of second section 154. The first section 150 may be rotatable from the vertical position to the folded position in the direction shown by the arrow in FIG. 9B. FIG. 9C shows the first section 150 and the second section 154 in a folded position. The first and second sections 150 and 154 in the folded position may be rotated in the direction shown by the arrow in FIG. 9C. FIG. 9D shows the first panel 50 in the upright folded position 50C. The first section 150 is shown in an inverted position.

Figure 9E:
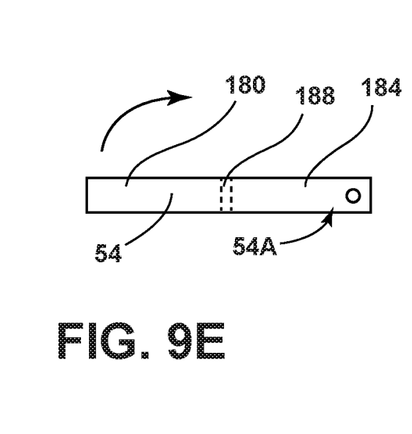
FIG. 9E is a schematic cross-sectional view of the second panel in a flat orientation.
Figure 9F:
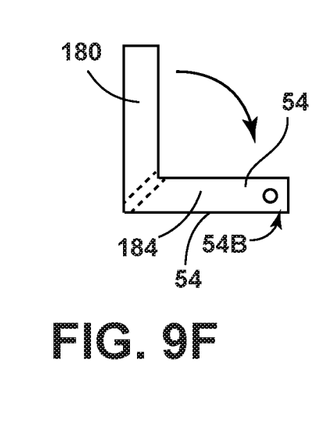
FIG. 9F is a schematic cross-sectional view of the second panel in a bent orientation.
Figure 9G:
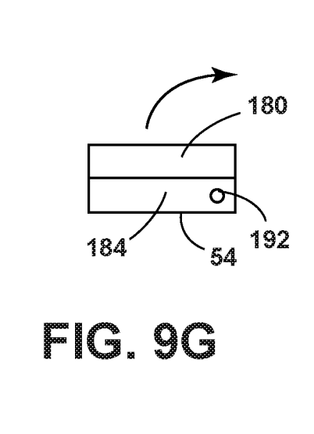
FIG. 9G is a schematic cross-sectional view of the second panel in a folded orientation.
Figure 9H:
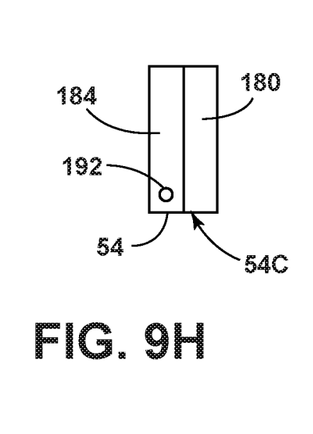
FIG. 9H is a schematic cross-sectional view of the second panel in the upright folded orientation.

FIG. 9E is a schematic view of the second panel 54 in a flat orientation 54A. The first portion 180 of the second panel 54 may be rotated from a horizontal orientation to a vertical orientation in the direction shown by the arrow in FIG. 9E. In FIG. 9F, the second panel 54 is in the bent orientation 54B. The first portion 180 is shown in a vertical orientation that may be orthogonal to the horizontal orientation of the second portion 184. The first portion 180 may be rotatable from the vertical orientation to the folded orientation in the direction shown by the arrow in FIG. 9F. FIG. 9G shows the first portion 180 and the second portion 184 in a folded orientation. The first and second portions 180 and 184 in the folded orientation may be rotated about the pivoting connection 192 in the direction shown by the arrow in FIG. 9G. FIG. 9H shows the second panel 54 in the upright folded orientation 54C. The first portion 180 is shown in an inverted orientation. As such, FIGS. 9A-9H provide detail about the movement of the first and second panels 50, 54 between the flat position 50A and the upright folded position 50C for the first panel 50 and between the flat orientation 54A and the upright folded orientation 54C for the second panel 54.

Figure 10:
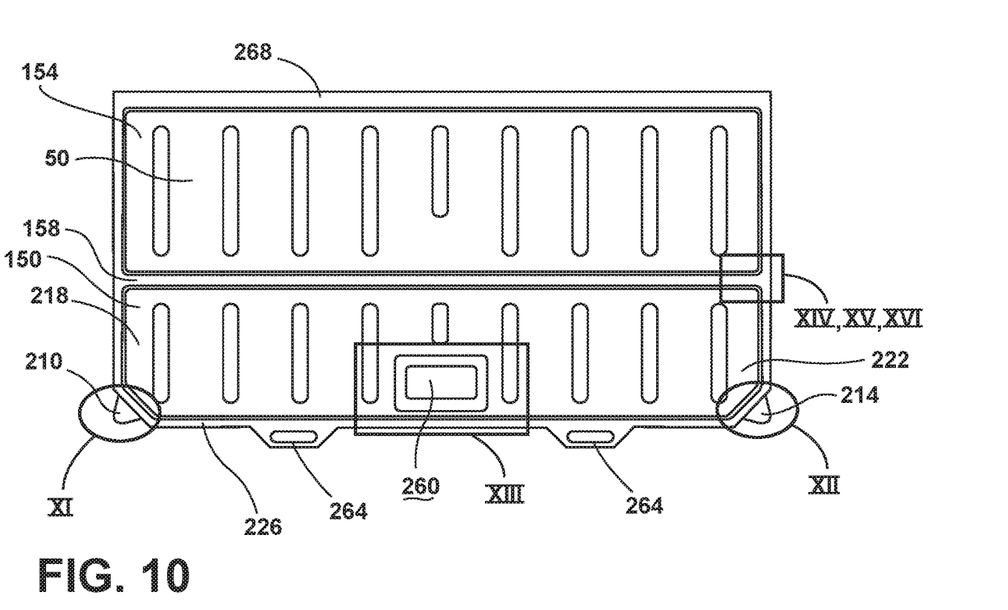
FIG. 10 is a top elevational view of the first panel.

Referring to FIGS. 9-10, in various aspects of the disclosure, it may be desirable to secure the first panel 50 (and cargo that may be loaded on the first panel 50) in the first position 51 or the second position 52 to minimize movement of the first panel 50 during driving conditions that may include stops, acceleration, uneven terrain, and vehicle impacts. The first panel 50 may include at least a first attachment tab 210 and a second attachment tab 214 configured to mount the first panel 50 to the cabin floor 34 or the second panel 54. The first and second attachment tabs 210, 214 may extend from the first panel 50 at first and second corners 218, 222 of the rear peripheral edge 226. Each of the first and second attachment tabs 210, 214 may be adapted as a flat extension or foot of the first panel 50 and may be integral with the first panel 50 or attached via an attachment assembly. Each of the first and second attachment tabs 210, 214 may be comprised of an impact resistant plastic or metal.

Referring to FIG. 10, the first panel 50 may include a peripheral rim 268 to retain cargo items in the first panel 50. The peripheral rim 268 may assist in keeping cargo within the first panel 50 while the first panel 50 is moved between the first and second positions 51, 52 and while the vehicle 22 is in motion.

In various aspects, the first panel 50 may include features that assist an individual in moving the first panel 50 between the first and second positions 51, 52 and in accessing the storage space 30 disposed below the cabin floor 34. With continued reference to FIG. 10, a cutaway portion 260 may be disposed in the first panel 50 to provide access to a handle 262 (FIG. 4) that may be disposed on the second panel 54 when the first and second panels 50, 54 are in the stacked configuration (i.e., first panel 50 is in the first position 51). Grab handles 264 may be located on the rear peripheral edge 226 of the first panel 50 to allow an individual to easily push the first panel 50 away from the outer area 120 of the vehicle cabin 18 and into the inner area 124 of the vehicle cabin 18 and to pull the first panel 50 from the inner area 124 of the vehicle cabin 18 towards the outer area 120 of the vehicle cabin 18 during cargo transfer (FIGS. 3-4).

Figure 11:
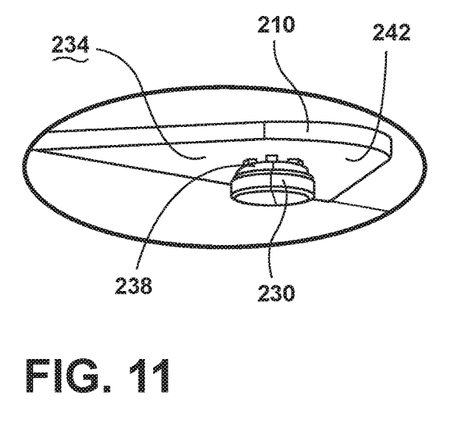
FIG. 11 is a perspective view of a tab with a push pin from detail XI shown in FIG. 10.

With reference to FIGS. 10-11, a rounded snap-fitting pin 230 may extend from a bottom surface 234 of each of the first and second attachment tabs 210, 214. FIG. 11 is from detail XI shown in FIG. 10. The snap-fitting pin 230 may include a collar 238 that surrounds at least a portion of the snap-fitting pin 230. When the first panel 50 is in the first position 51, the collar 238 may be configured to snap-fit within an aperture (not shown) located on the cabin floor 34. Once the collar 238 has passed through a surface of the cabin floor 34, the snap-fitting pin 230 may be retained within an aperture (not shown). The first and second attachment tabs 210, 214 may include a toe 242 that forms the end of the first and second attachment tabs 210, 214, which may enable an individual to release the snap-fitting pin 230 from the aperture (not shown) by pulling upwards on the toe 242. Once the first and second attachment tabs 210, 214 have been disengaged from the aperture (not shown), the first panel 50 may be slid to the second position 52 in the vehicle cargo compartment 14. When the first panel 50 is in the second position 52, then the snap-fitting pins 230 may be used to retain the second panel 54 to the first panel 50 to retain the second panel 54 in the second position 52 (FIG. 9).

The second panel 54 may include apertures (not shown) for receiving the snap-fitting pins 230.

Figure 12:
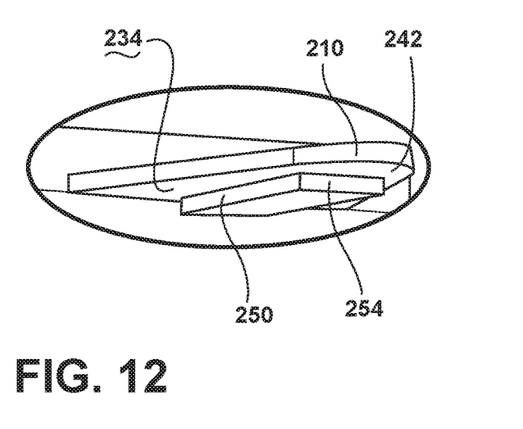
FIG. 12 is a perspective view of a tab with a hook-and-loop portion from detail XII shown in FIG. 10.

With reference to FIGS. 10 and 12, in an alternate aspect, a hook-and-loop fastener 250 such as Velcro® may be used in place of the snap-fitting pin 230. FIG. 12 is from detail XII shown in FIG. 10. When the first panel 50 is in the first position 51, the hook-and-loop fastener 250 may have a first portion 254 disposed on the first and second attachment tabs 210, 214 and a second portion (not shown) disposed on the cabin floor 34. When the first panel 50 is in the second position 52, the hook-and-loop fastener 250 may have a first portion 254 disposed on the first and second attachment tabs 210, 214 and a second portion (not shown) disposed on the second panel 54. Thus, through securing the first panel 50 in the first position 51 or the second position 52, the first panel 50 may be secure for safe cargo transportation in a variety of driving conditions (e.g., stops, acceleration, uneven terrain, vehicle impacts).

Figure 13:
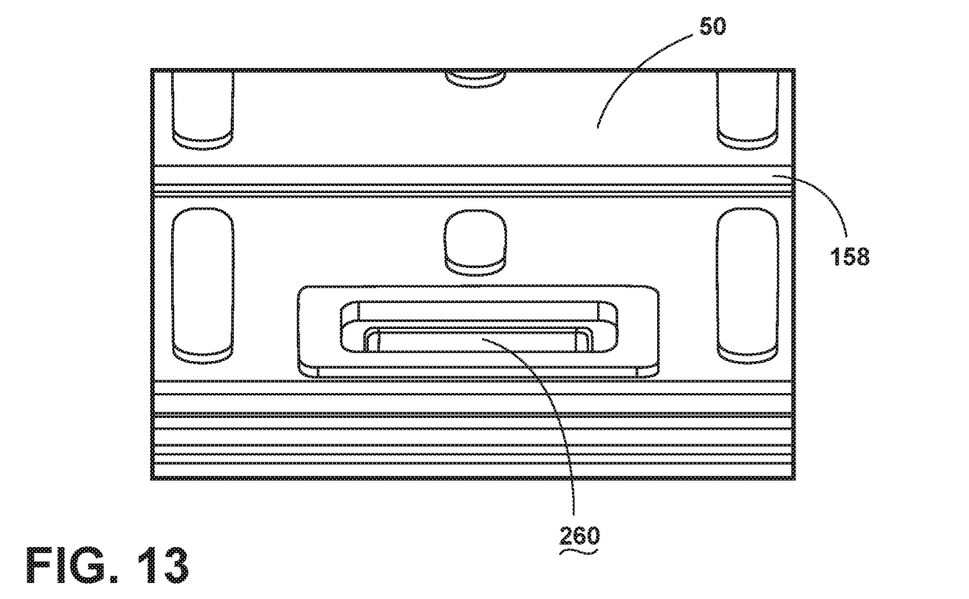
FIG. 13 is a perspective view of a cutaway portion of the first panel from detail XIII shown in FIG. 10.

FIG. 13 shows a perspective view of the cutaway portion 260 of the first panel 50 that was previously shown in FIG. 10. FIG. 13 is from detail XIII shown in FIG. 10.

Figure 14:
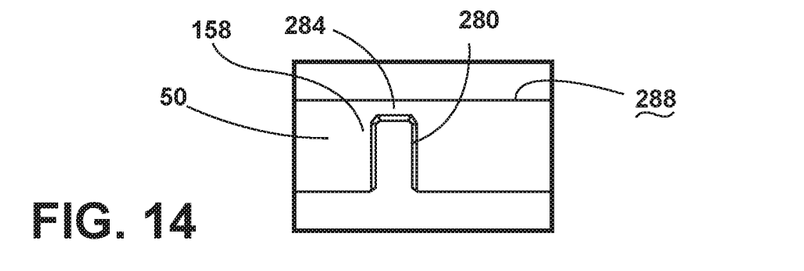
FIG. 14 is a cross-sectional view of a first variant of a thinned zone of the first panel from detail XIV shown in FIG. 10.
Figure 15:
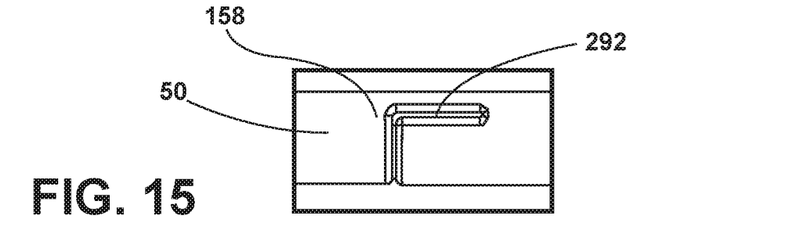
FIG. 15 is a cross-sectional view of a second variant of a thinned zone of the first panel from detail XV shown in FIG. 10.
Figure 16:
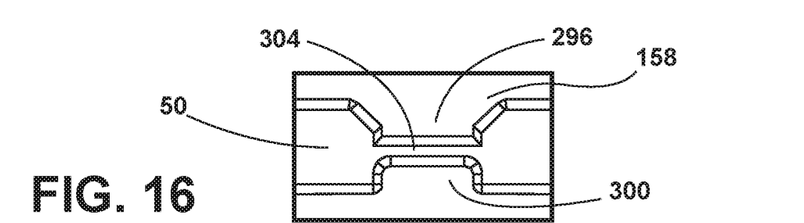
FIG. 16 is a cross-sectional view of a third variant of a thinned zone of the first panel from detail XVI shown in FIG. 10.

In various aspects, different designs may be used to achieve a bendable intersection 158 in the first panel 50. Referring to FIGS. 10 and 14-16, in various aspects, the bendable intersection 158 of the first panel 50 may be a thinned zone. The thinned zone may be configured to enable bending and folding between a first section 150 and a second section 154 of a first panel 50. FIG. 14 depicts a first variant with a rectangular channel 280 that may enable bending and folding of the first panel 50. FIG. 14 is from detail XIV shown in FIG. 10. The rectangular channel 280 may provide a section 284 with a reduced thickness at an upper surface 288 of the first panel 50. Referring to FIG. 15, a second variant shows an L-shaped channel 292 that may provide an alternative configuration that allows for bending and folding along the length of the first panel 50. FIG. 15 is from detail XV shown in FIG. 10. FIG. 16 shows a third variant with a top channel 296 and a bottom channel 300 in the first panel 50. FIG. 16 is from detail XVI shown in FIG. 10. The top channel 296 and the bottom channel 300 may define a section 304 with a reduced thickness in the first panel 50. The variants shown in FIGS. 14-16 may allow for bending and folding of the first panel 50 from a flat position 50A to a bent position 50B and an upright folded position 50C. In various aspects, the first panel 50 may utilize other configurations that enable bending and folding that may be particular to various materials and design features of the first panel 50.

In various aspects, the bendable intersection 188 of the second panel 54 may include a thinned zone similar to that of the first panel 50 to form a bendable intersection 188 between the first portion 180 and the second portion 184 of the second panel 54. The second panel 54 may include other configurations to facilitate bending and folding from a flat orientation 54A to a bent orientation 54B to an upright folded orientation 54C that are particular to the characteristics of the second panel 54. For example, if the second panel 54 is a cover for the storage space 30, then the second panel 54 may be made of a carpet-like material disposed over a structural component. In various aspects, the structural component may include various configurations that may enable bending and folding of the structural component that may be particular to material and design features of the structural component.

Figure 17:
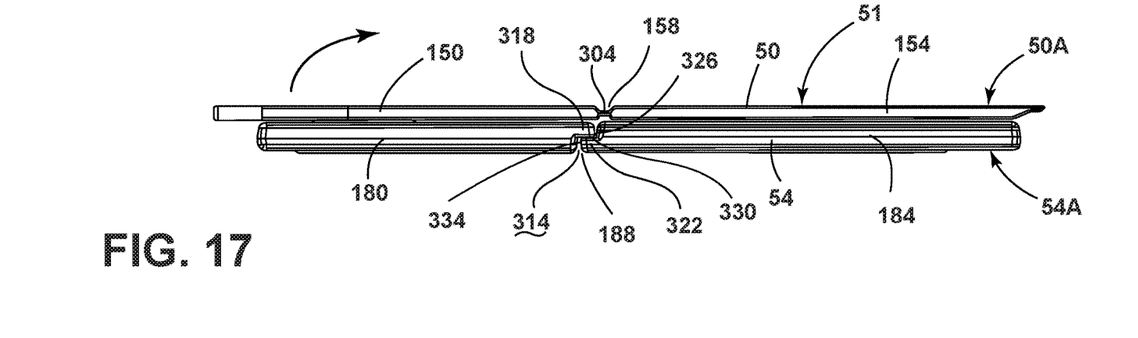
FIG. 17 is a side elevational view of the first panel in the flat position and the second panel in the flat orientation of an exemplary embodiment.
Figure 18:
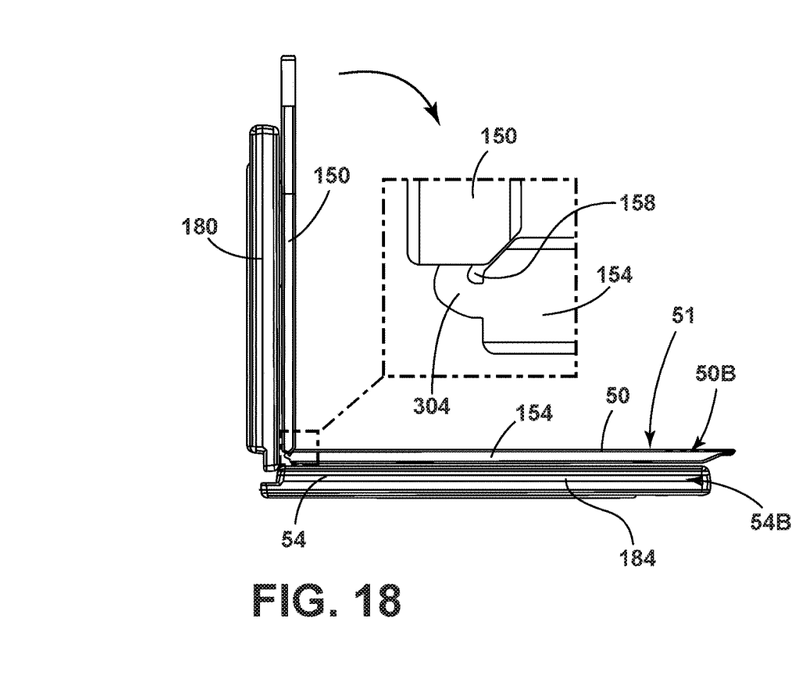
FIG. 18 is a side elevational view of the first panel in the bent position and the second panel in the bent orientation of an exemplary embodiment.
Figure 19:
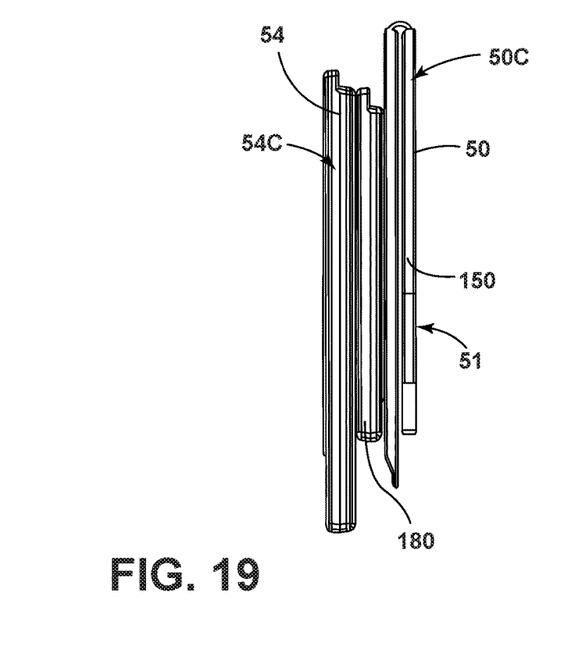
FIG. 19 is a side elevational view of the first panel in the upright folded position and the second panel in the upright folded orientation of an exemplary embodiment.

Referring now to FIGS. 17-19, an exemplary embodiment of the first panel 50 and the second panel 54 in various configurations is shown. In the depicted embodiment of FIGS. 17-19, the first panel 50 and the second panel 54 are illustrated with the first panel 50 in the first position 51 (stacked position). It is to be understood that the first and second panels 50, 54 shown in FIGS. 17-19 could each be arranged in the shown configurations independently of one another.

With reference to FIG. 17, an exemplary embodiment of the first and second panels 50, 54 in configurations as depicted in FIGS. 9A and 9E is shown. The first panel 50 is shown in the flat position 50A. The second panel 54 is shown in the flat orientation 54A. The first panel 50 may include a first section 150 and a second section 154. A bendable intersection 158 may be disposed between the first section 150 and the second section 154. A section 304 with a reduced thickness may be in the bendable intersection 158 of the first panel 50. Section 304 is shown in FIG. 16, and section 304 was previously discussed in relation to FIG. 16. The first section 150 of the first panel 50 may be rotated from a horizontal position to a vertical position in the direction shown by the arrow in FIG. 17. The second panel 54 may include a first portion 180 and a second portion 184. A bendable intersection 188 may be disposed between the first portion 180 and the second portion 184. The bendable intersection 188 of the second panel 54 may include a step-like interface 314 between the first portion 180 of the second panel 54 and the second portion 184 of the second panel 54. The step-like interface 314 may be disposed along the length of the second panel 54 along the bendable intersection 188 of the second panel 54. The first portion 180 may include a first protrusion 318. The second portion 184 may include a second protrusion 322. When the second panel 54 is in a flat orientation 54A, a lower surface 326 of the first protrusion 318 may abut an upper surface 330 of the second protrusion 322 at an interface area 334. As previously discussed, in various embodiments the second panel 54 may be a cover. A carpet or other overlay may be disposed over the cover. In various embodiments, the carpet or other overlay may help to retain the first portion 180 to the second portion 184.

Referring to FIG. 18, an exemplary embodiment of the first and second panels 50, 54 in the configurations depicted in FIGS. 9B and 9F is shown. An exploded view is shown of section 304 in the bendable intersection 158. The first panel 50 is shown in the bent position 50B. The first section 150 is shown in a vertical position that may be orthogonal to the horizontal position of the second section 154. The first section 150 may be rotatable from the vertical position to the folded position in the direction shown by the arrow in FIG. 18. The second panel 54 is shown in the bent orientation 54B. The first portion 180 is shown in a vertical orientation that may be orthogonal to the horizontal orientation of the second portion 184. The first portion 180 may be rotatable from the vertical orientation to the folded orientation in the direction shown by the arrow in FIG. 18.

Referring to FIG. 19, an exemplary embodiment of the first and second panels 50, 54 as shown in FIGS. 9D and 9H is shown. The first panel 50 is shown in the upright folded position 50C. The first section 150 is shown in an inverted position. The second panel 54 is shown in the upright folded orientation 54C. The first portion 180 is shown in an inverted orientation. As such, FIGS. 17-19 show various configurations of an exemplary embodiment of the first and second panels 50, 54.

A variety of advantages may be derived from use of the present disclosure. The first panel and the second panel may provide a slidable assembly that assists the individual in loading cargo. The first panel and the second panel may be configured to allow for convenient access to the storage space below the cabin floor.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicular cargo assembly comprising:
   a first panel slidably mounted on a floor of a vehicle cabin and selectively and alternatively positionable in a first position or a second position;
   a storage space disposed below the floor, wherein the first panel is configured to cover the storage space in the first position; and
   a second panel disposed over the storage space and positioned below the first panel when the first panel is in the first position, wherein when the first panel is in the first position, the first panel is selectively and alternatively positionable in a flat position, a bent position, and an upright folded position.

2. The vehicular cargo assembly of claim 1, wherein the second panel is selectively and alternatively positionable in a corresponding and respective flat orientation, a bent orientation, and an upright folded orientation.

3. The vehicular cargo assembly of claim 2, wherein the storage space comprises a first storage space and a second storage space.

4. The vehicular cargo assembly of claim 3, wherein when the first panel is in the bent position and the second panel is in the bent orientation, then the first storage space is accessible.

5. The vehicular cargo assembly of claim 4, wherein when the first panel is in the upright folded position and the second panel is in the upright folded orientation, then the first and second storage spaces are accessible.

6. The vehicular cargo assembly of claim 1, wherein when the first panel is in the second position, the second panel is selectively and alternatively positionable in a flat orientation, a bent orientation, or an upright folded orientation.

7. The vehicular cargo assembly of claim 1, wherein when the first panel is in the second position a first portion of the second panel is rotatable from a substantially horizontal orientation to a substantially vertical orientation, so that the first portion of the second panel is orthogonal to a second portion of the second panel to allow access to a first storage space.

8. The vehicular cargo assembly of claim 7, wherein when the first panel is in the second position the first portion of the second panel is rotatable from the substantially vertical orientation to an inverted orientation to allow access to the first storage space and a second storage space.

9. The vehicular cargo assembly of claim 1, wherein the first panel includes fasteners to restrain the first panel in one or more of the first position and the second position.

10. The vehicular cargo assembly of claim 1, wherein the first panel comprises a thinned zone forming a bendable intersection between a first section and a second section of the first panel.

11. The vehicular cargo assembly of claim 1, wherein the first panel includes a peripheral rim.

12. The vehicular cargo assembly of claim 1, wherein the first panel is slidably coupled to the second panel, wherein the first panel moves from the first position to the second position to transfer cargo from an outer area to an inner area of the vehicle cabin, wherein the first panel is stacked above the second panel in the first position, and wherein the first panel is adjacent the second panel in the second position.

13. The vehicular cargo assembly of claim 1, further comprising:
   a seating assembly adjacent to the first and second panels when the first panel is in the first position, wherein the seating assembly is selectively positionable in an upright position and a downward position, and wherein the first panel is disposed over the seating assembly in a downward position when the first panel is in the second position.

14. A vehicular cargo assembly comprising:
   a first panel slidably mounted on a floor of a vehicle cabin and selectively and alternatively positionable in a first position or a second position;
   a storage space disposed below the floor, wherein the first panel is configured to cover the storage space in the first position; and
   a second panel disposed over the storage space and positioned below the first panel when the first panel is in the first position, wherein when the first panel is in a second position, the second panel is selectively and alternatively positionable in a flat orientation, a bent orientation, or an upright folded orientation.

15. The vehicular cargo assembly of claim 14, wherein when the first panel is in the second position a first portion of the second panel is rotatable from a substantially horizontal orientation to a substantially vertical orientation, so that the first portion of the second panel is orthogonal to a second portion of the second panel to allow access to a first storage space.

16. The vehicular cargo assembly of claim 15, wherein when the first panel is in the second position and the first portion of the second panel is rotatable from the substantially vertical orientation to an inverted orientation to allow access to the first storage space and a second storage space.

* * * * *